H. S. BLYNT.
PNEUMATIC VEHICLE TIRE.
APPLICATION FILED MAY 23, 1921.
1,416,252.
Patented May 16, 1922.
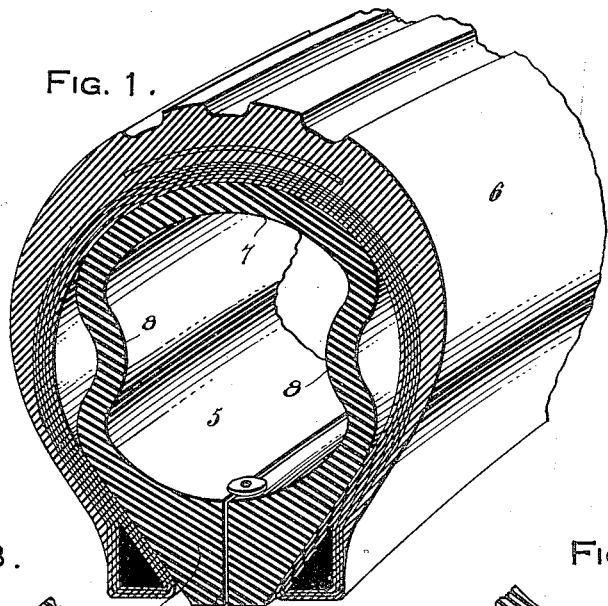
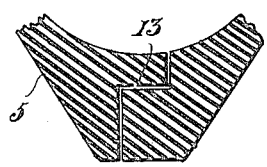
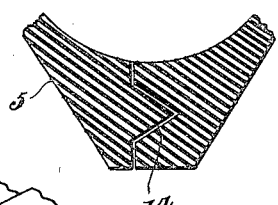
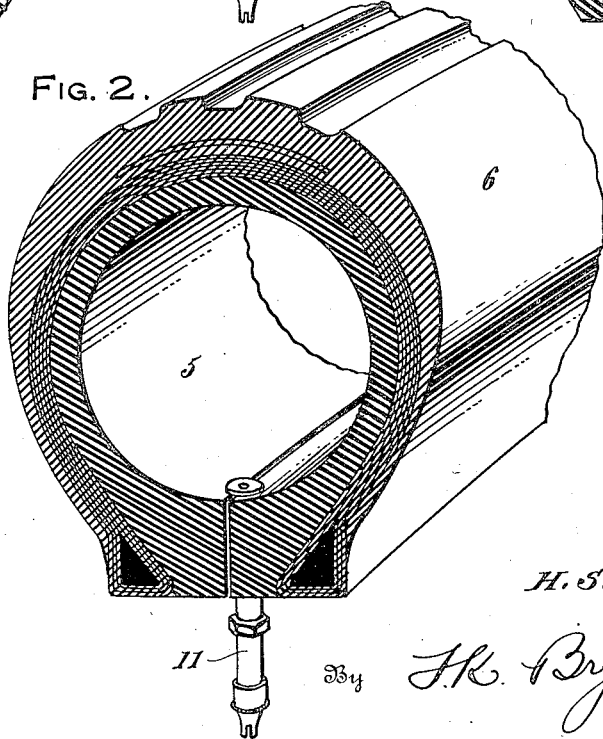
Inventor
H. S. Blynt
By H. R. Bryant,
Attorney

UNITED STATES PATENT OFFICE.

HERBERT S. BLYNT, OF YALE, OKLAHOMA.

PNEUMATIC VEHICLE TIRE.

1,416,252.   Specification of Letters Patent.   Patented May 16, 1922.

Application filed May 23, 1921.  Serial No. 471,681.

*To all whom it may concern:*

Be it known that I, HERBERT S. BLYNT, a citizen of the United States of America, residing at Yale, in the county of Payne and State of Oklahoma, have invented certain new and useful Improvements in Pneumatic Vehicle Tires, of which the following is a specification.

This invention relates to certain new and useful improvements in pneumatic vehicle tires and more particularly to the pneumatic inner tubes thereof known as the compression type of tube.

Inner tubes now in common use, when placed under air pressure within the usual tire casings, are forced out of their natural round cross sectional shape so as to fit the somewhat pear shaped space within the casing, thus placing considerable strain and wear upon the inner portions of the tubes where they are weakest. It is an object of the present invention to provide an inner tube with a thickened inner portion formed to snugly fit within the wedge-shaped inner portion of the space within the casing whereby a circular interior will be provided for the tube when the latter is inflated and whereby the tube will be extremely strong and strain resisting at the inner portion.

Another object of the invention is to provide a compression inner tube of endless form with annular endless side folds or depressions and circumferentially split at its inner portion whereby, when the tube is inflated the side and tread portions of the same are placed under transverse compression and the abutting edges of the tube at the inner portion of the same are forcibly pressed together for forming an air-tight joint where the tube is split so that retention of the air under pressure within the tube is insured while effective healing of punctures in the side and tread portion of the tube will be had.

With the above general objects in view and others that will appear as the nature of the invention is better understood, the same consists in the novel form, combination and arrangement of parts hereinafter more fully described, shown in the accompanying drawing and claimed.

In the drawing, wherein like reference characters designate corresponding parts throughout the several views, Figure 1 is a sectional perspective view of a fragment of a tire employing a pneumatic inner tube constructed in accordance with the present invention, with the tube deflated, Figure 2 is a view similar to Fig. 1, with the tube under inflation air pressure, Figure 3 is a fragmentary sectional view of a modified form of the inner portion of the tube, and Figure 4 is a view similar to Fig. 3 of a still further modification thereof.

Referring more in detail to the several views, the present invention resides particularly in the provision of an endless pneumatic tube 5 for use within the usual form of tire casing 6, and said tube is formed to normally have a convex tread portion 7 with endless annular inwardly extending folds or depressions 8 at the opposite sides of the tube whereby the tube is normally formed of a greater external diameter than the internal diameter of the casing 6, the side and tread portions of the tube being of uniform thickness, and the inner portion of the tube being of wedge-shaped form and materially thickened as at 9 to fit the similarly shaped space between the bead portions of the casing 6 where considerable strength for the tube is essential.

The inner portion of the tube is split circumferentially as at 10 so that the tube is normally incapable of holding air under pressure, and so that access may be had to the interior of the tube for repairs. The manufacture of a split tube can be had with considerably less expense and trouble than tubes which are not split so that this forms an important item in quantity production and the production of an inexpensive tube.

The usual inflation valve 11 is preferably inserted at the split portion of the tube, and the inner circumference of the tube as at 12 is preferably of slightly lesser length than the length of the outer circumference of the rim upon which the tire is to be used.

In use, the inner tube 5 is placed within the casing 6 as shown in Fig. 1 and the tube and casing are then placed upon any usual form of rim by stretching the tube through the instrumentality of a common form of tool used for that purpose. When this is done the inner portion of the tube is forced outwardly a slight distance so as to tend to bring the meeting edges of the inner portion of the tube together. Air under pressure is then introduced through the valve 11 and the folds 8 are thereby forced into contact with the inner face of the casing 6. This places the material of the tube under transverse compression so as to effectively wedge the meeting portions of the inner portion of the tube together whereby retention of the air within the tube is insured. Should the casing and tube become punctured by a nail or other sharp device or article, the rubber will expand to close the puncture and thus the tube is self-healing. By making the walls of the tube at the side and tread portions of uniform thickness and thickening the inner portion of the tube, a substantially circular space is provided within the tube, so that an even distribution of the air pressure is had and tearing of the tube by reason of the same rusting to the rim is made unlikely.

Further advantages of a split tube of the present general kind are explained at length in my copending application Serial No. 437,554, filed January 15, 1921 for pneumatic vehicle tires.

Referring to Fig. 3, the tube may be provided with a lap joint as at 13 for more efficiently insuring sealing of the circumferential split at the inner portion of the same, or, the same may be provided with a tongue and groove joint as at 14 in Fig. 4 for this purpose.

From the foregoing description it is believed that the construction and operation as well as the advantages of the present invention will be readily understood and appreciated by those skilled in the art.

What is claimed as new is:—

1. As an article of manufacture, an endless inner tube for pneumatic tires having an external diameter greater than the internal diameter of the casing with which it is to be used and having an inwardly extending annular fold or depression whereby, when the tube is inflated within said casing, said tube is caused to be placed under compression transversely, said tube being circumferentially split at its inner portion.

2. As an article of manufacture, an endless inner tube for pneumatic tires having an external diameter greater than the internal diameter of the casing with which it is to be used and having an inwardly extending annular fold or depression whereby, when the tube is inflated within said casing, said tube is caused to be placed under compression transversely, said tube being circumferentially split at its inner portion, the inner portion of the tube being relatively thicker than the remaining portion thereof and of wedge-shape, whereby the meeting edges of the tube at the inner portion of the latter are forced together when the tube is inflated.

3. As an article of manufacture, an endless inner tube for pneumatic tires having an external diameter greater than the internal diameter of the casing with which it is to be used and having an inwardly extending annular fold or depression whereby, when the tube is inflated within said casing, said tube is caused to be placed under compression transversely, said tube being circumferentially split at its inner portion, the inner portion of the tube being relatively thicker than the remaining portion thereof and of wedge-shape, whereby the meeting edges of the tube at the inner portion of the latter are forced together when the tube is inflated, the tread portion of the tube being of convex form, and one annular fold or depression being provided in each side of the tube.

4. As an article of manufacture, an endless inner tube for pneumatic tires having an external diameter greater than the internal diameter of the casing with which it is to be used and having an inwardly extending annular fold or depression whereby, when the tube is inflated within said casing, said tube is caused to be placed under compression transversely, said tube being circumferentially split at its inner portion, the inner portion of the tube being relatively thicker than the remaining portion thereof and of wedge-shape, whereby the meeting edges of the tube at the inner portion of the latter are forced together when the tube is inflated, the side and tread portions of the tube being of sufficiently uniform thickness.

5. As an article of manufacture, an endless inner tube for pneumatic tires having an external diameter greater than the internal diameter of the casing with which it is to be used and having an inwardly extending annular fold or depression whereby, when the tube is inflated within said casing, said tube is caused to be placed under compression transversely, said tube being circumferentially split at its inner portion, the inner portion of the tube being relatively thicker than the remaining portion thereof and of wedge-shape, whereby the meeting edges of the tube at the inner portion of the latter are forced together when the tube is inflated, the circumferential length of the inner portion of the tube being normally less than the circumferential length of the rim upon which the tube is to be used.

6. As an article of manufacture, an endless inner tube for pneumatic tires having an external diameter greater than the internal diameter of the casing with which it is to be used and having an inwardly extending annular fold or depression whereby, when the tube is inflated within said casing, said tube is caused to be placed under compression transversely, said tube being circumferentially split at its inner portion, the inner portion of the tube being relatively thicker than the remaining portion thereof and of wedge-shape, whereby the meeting edges of the tube at the inner portion of the latter are forced together when the tube is inflated, the thickened inner portion of the tube being provided with an interlocking joint at the split portions thereof.

In testimony whereof I affix my signature in presence of two witnesses.

HERBERT S. BLYNT.

Witnesses:
AGNES CRUME,
LESTER B. SHERWOOD.